United States Patent [19]

Imafuji et al.

[11] Patent Number: 5,337,098

[45] Date of Patent: Aug. 9, 1994

[54] CAMERA-SHAKE PREVENTING DEVICE

[75] Inventors: Kazuharu Imafuji, Yokohama; Nobuhiko Terui, Ichikawa, both of Japan

[73] Assignee: Nikon Corporation, Tokyo, Japan

[21] Appl. No.: 5,566

[22] Filed: Jan. 19, 1993

[30] Foreign Application Priority Data

Feb. 14, 1992 [JP] Japan ................. 4-059643

[51] Int. Cl.$^5$ ............................................. G03B 39/00
[52] U.S. Cl. ............................. 354/70; 354/430; 354/195.12; 354/286
[58] Field of Search ............ 354/70, 430, 195.12, 354/286

[56] References Cited

U.S. PATENT DOCUMENTS

| | | | |
|---|---|---|---|
| 4,965,619 | 10/1990 | Shikaumi et al. | 354/410 |
| 5,117,246 | 5/1992 | Takahashi et al. | 354/202 |
| 5,175,580 | 12/1982 | Shiomi | 354/430 |

FOREIGN PATENT DOCUMENTS 2-58037 2/1990 Japan .
4-110835 4/1992 Japan .

*Primary Examiner*—Monroe H. Hayes
*Attorney, Agent, or Firm*—Shapiro and Shapiro

[57] ABSTRACT

A camera-shake preventing device for preventing an image deflection due to a camera-shake by driving a part of an optical system on detecting the camera-shake, device being capable of restraining a futile consumption of a battery and previously confirming an effect to compensate the camera-shake.

The device has a camera-shake detector, a computing unit, a camera-shake compensating lens, a lens driving unit and a compensating mode selecting unit. The camera-shake detector detects the camera-shake caused by a hand movement. The computing unit computes a proper camera-shake compensation quantity from the detected camera-shake. The camera-shake compensating lens is drivable for compensating the camera-shake. The lens driving unit drives the camera-shake compensating lens in such a direction as to cause no image deflection in accordance with the compensation quantity computed by the computing unit. The compensating mode selecting unit selects any one of camera-shake compensating modes, i.e., a regular compensating mode for regularly compensating the camera-shake after a release button has been half-depressed and a release compensating mode for compensating the camera-shake after the release button has been full-depressed.

2 Claims, 5 Drawing Sheets

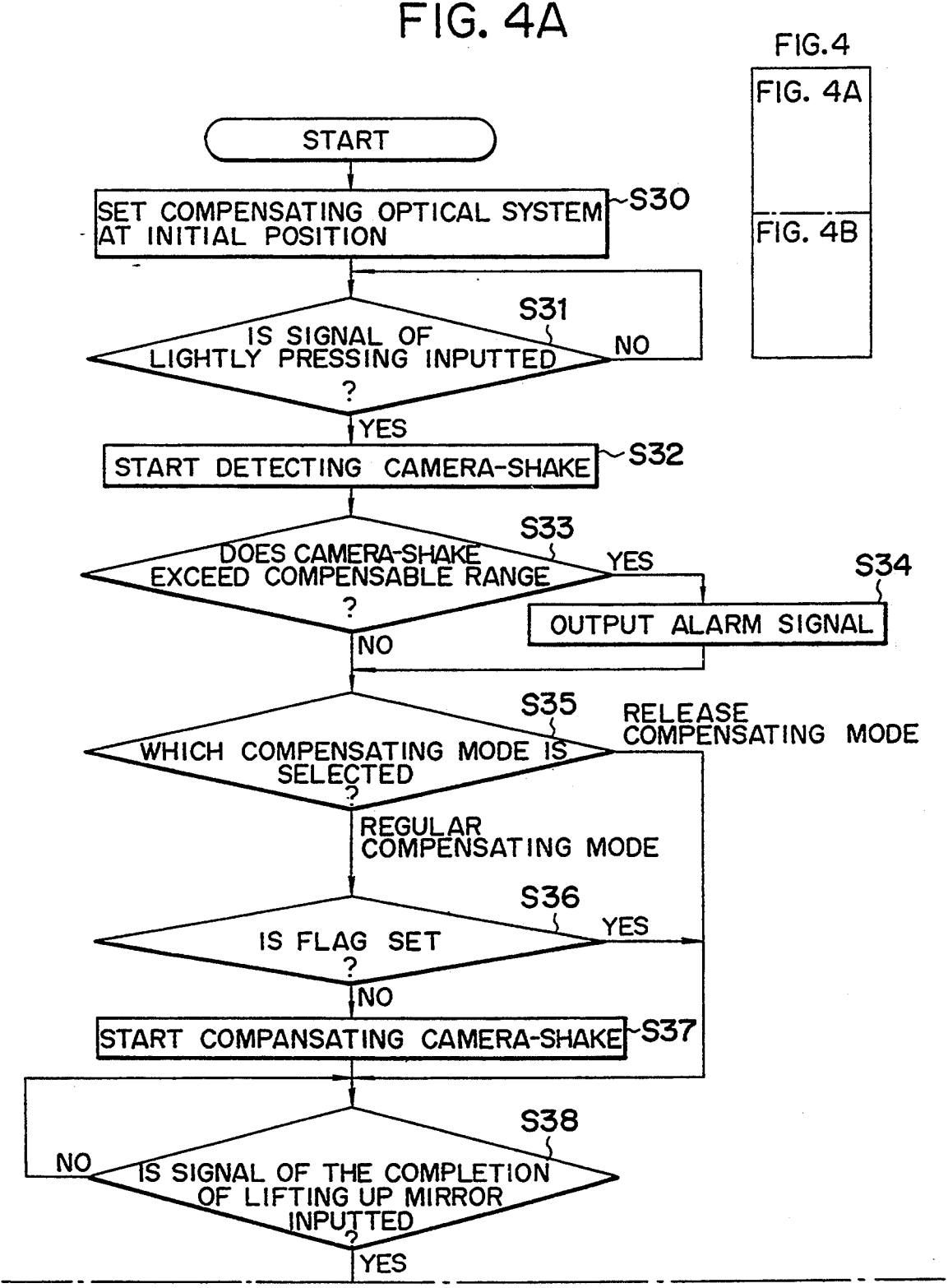

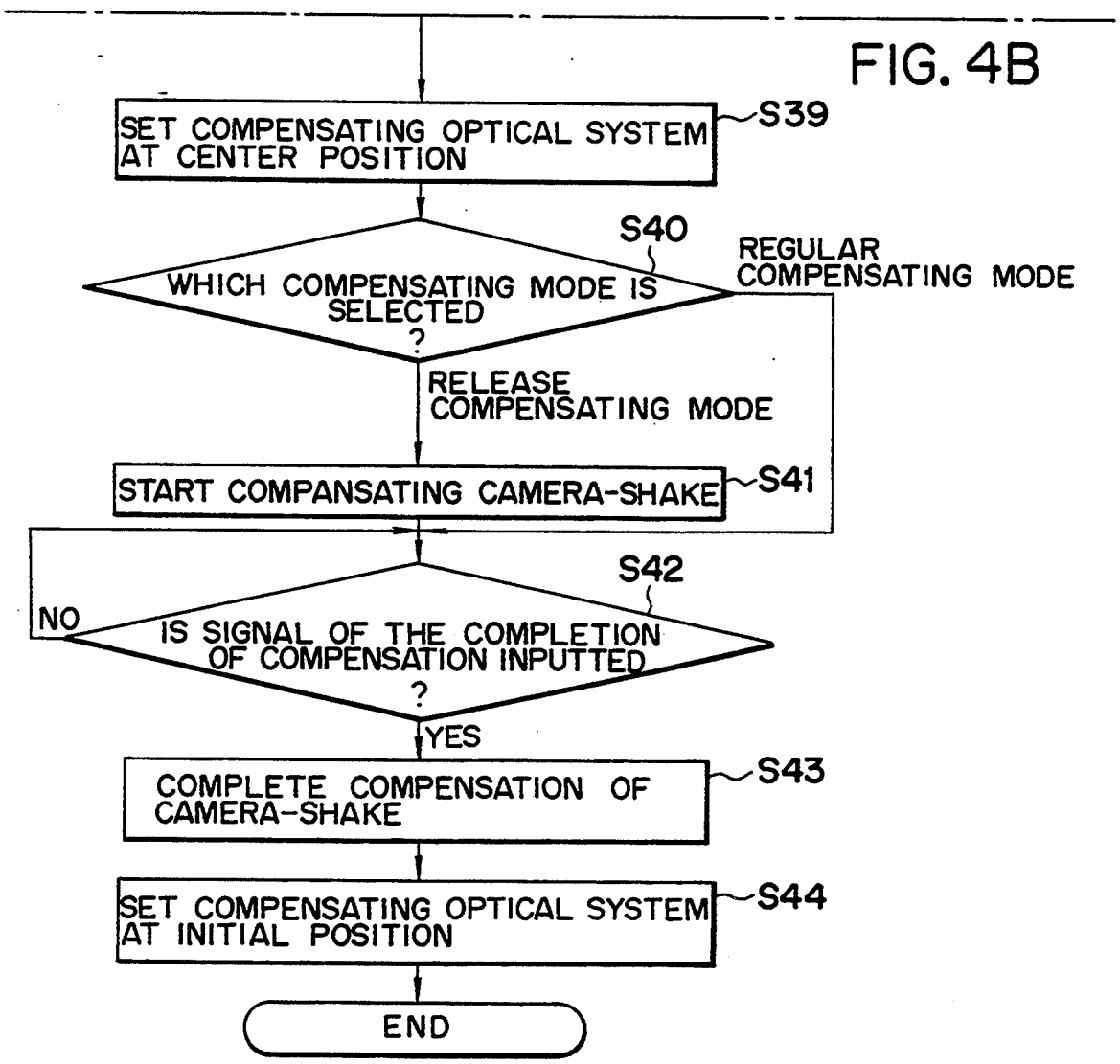

CAMERA-SHAKE PREVENTING DEVICE

BACKGROUND OF THE INVENTION

1. Field of the Invention

The present invention relates to a camera-shake preventing device for preventing an image deflection due to a camera-shake by driving a part of an optical system on detecting the camera-shake.

2. Related Background Art

A known device has hitherto prevented a camera-shake by the following steps. The camera-shake caused by a hand movement is detected by use of a camera-shake detecting unit such as an angular velocity sensor and an acceleration sensor consisting of a piezoelectric element, etc.. A proper camera-shake compensation quantity is computed from this detected camera-shake. An optical path is compensated by moving a compensating lens up and down or right and left on the basis of this compensation quantity.

In the conventional camera-shake preventing device, the detection and compensation of the camera-shake start from a half-depressed state of a release button. For this reason, if the release button remains half-depressed for a long time, the camera-shake preventing device has to be operated long. A large amount of electric power is consumed by the sensors and a motor that constitute the device. This leads to a consumption of the battery. Consequently, there arise inconveniences, wherein the device does not normally operate during photographing, or the camera body also does not normally operate when the power is supplied from the battery of the camera body.

Contrastingly, for detecting and compensating the camera-shake after the release button has been full-depressed, the battery consumption may be small. There is, however, such an inconvenience that an effect of compensating the camera-shake can not be confirmed beforehand by an observation of the photographer through a viewfinder.

SUMMARY OF THE INVENTION

It is a primary object of the present invention to provide a camera-shake preventing device capable of restraining a futile consumption of a battery and previously confirming an effect of compensating a camera-shake.

To accomplish the object given above, according to one aspect of the present invention, there is provided a device having: a camera-shake detector 4 for detecting the camera-shake caused by a hand movement; a computing unit 7 for computing a proper camera-shake compensation quantity from the detected camera-shake; a camera-shake compensating lens 5 drivable for compensating the camera-shake; a lens driving unit 6 for driving the camera-shake compensating lens 5 in such a direction as to cause no image deflection in accordance with the compensation quantity computed by the computing unit 7; and a compensating mode selecting unit 21 for selecting any one of camera-shake compensating modes, i.e., a regular compensating mode for regularly compensating the camera-shake after a release button has been half-depressed and a release compensating mode for compensating the camera-shake after the release button has been full-depressed. When the compensating mode selecting unit 21 selects the regular compensating mode, the compensation is started through the lens driving unit 6 after the camera-shake detecting unit 4 has started detecting the camera-shake. When the compensating mode selecting unit 21 selects the release compensating mode, the compensation is performed through the lens driving unit 6 after the release button has been full-depressed.

Further, a detector 3 for checking a consumed state of the power source battery is added to the camera-shake preventing device according to the present invention. When this detector detects that the battery is consumed over a predetermined quantity, the camera-shake is compensated through the lens driving unit 6 after the release button has been full-depressed even if the regular compensating mode is selected.

According to the present invention, the camera-shake compensating mode includes the regular compensating mode for regularly compensating the camera-shake after the release button has been half-depressed. The camera-shake compensating mode further includes the release compensating mode for compensating the camera-shake after the release button has been full-depressed. If the release button remains half-depressed for a long time, the release compensating mode is selected to restrain a futile consumption of the battery. When it is desired to confirm the effect of compensating the camera-shake, the regular compensating mode is selected. The compensation effect is thus confirmed.

Moreover, if the power source battery is consumed over the predetermined quantity, the camera-shake is compensated after the release button has been full-depressed even when the regular compensating mode is selected. A deterioration in operation during photographing because of the battery being consumed is thereby prevented.

BRIEF DESCRIPTION OF THE DRAWINGS

Other objects and advantages of the present invention will become apparent during the following discussion in conjunction with the accompanying drawings, in which:

FIG. 4A and 4B are a flowchart showing processing procedures of a camera-shake preventing action by a lens controller.

DETAILED DESCRIPTION OF THE PREFERRED EMBODIMENTS

Figure 1:
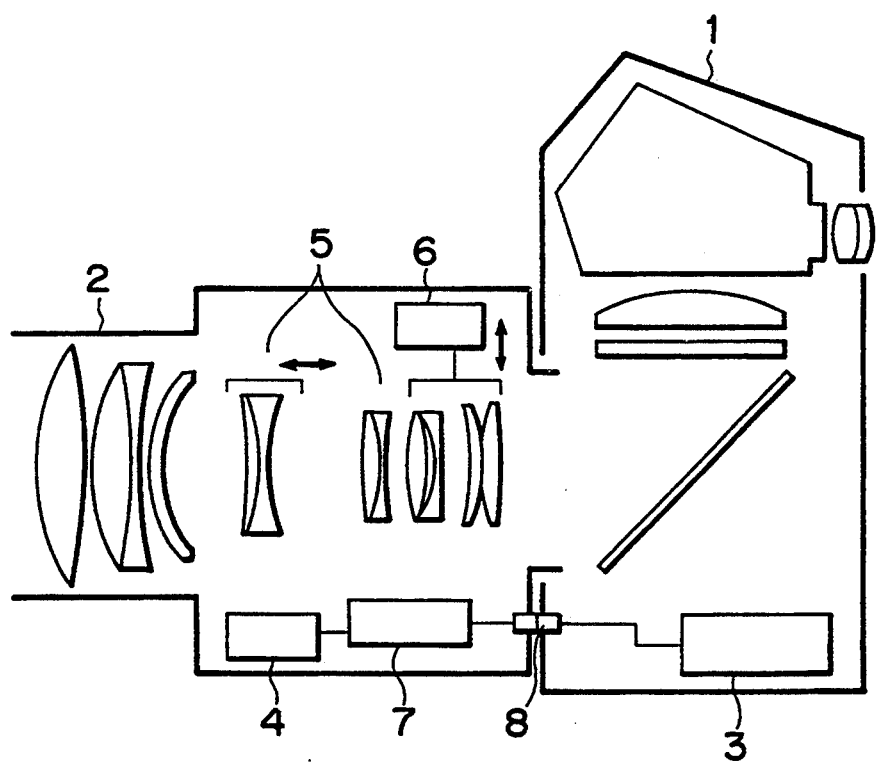
FIG. 1 is a schematic sectional view showing one embodiment of a single-lens reflex camera to which the present invention is applied.

FIG. 1 is a schematic sectional view showing one embodiment of a single-lens reflex camera to which a camera-shake preventing device according to the present invention is applied. This camera is constructed of a camera body 1 incorporating a camera-shake preventing function and an interchangeable lens 2.

The camera body 1 incorporates a computer-assisted camera body controller 3 for performing a variety of control processes such as exposure control, auto-focus control and display control. The interchangeable lens 2 incorporates: a camera-shake detecting sensor 4 as a camera-shake detector for detecting a camera-shake caused by a hand movement; a camera-shake compensating actuator 6 as a lens driver for compensating the camera-shake by driving a camera-shake compensating lens 5; and a computer-assisted lens controller 7 for controlling these components. The two controllers 3 and 7, connected to each other via a connector 8, are constructed to receive and transfer the data required.

Figure 2:
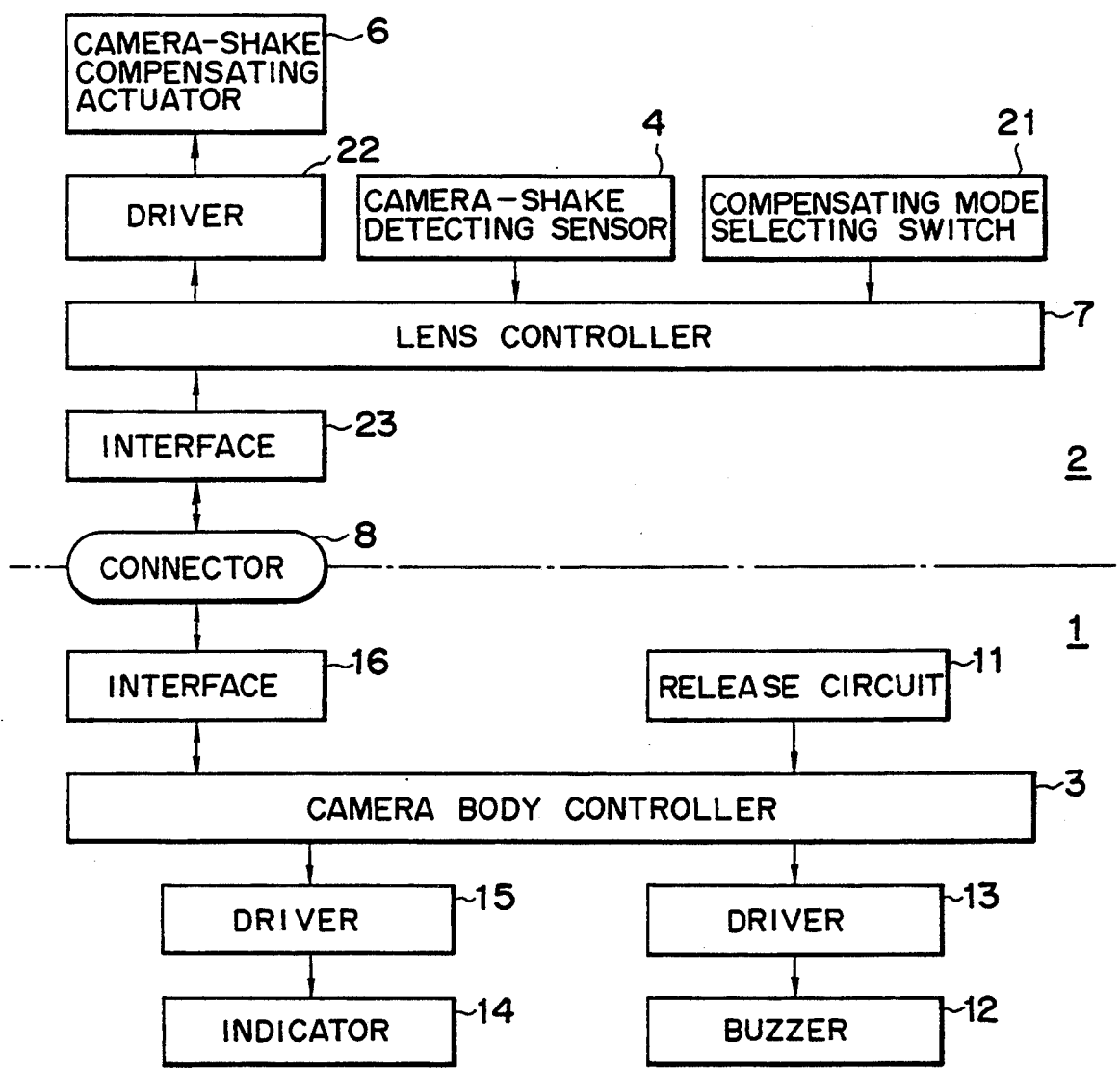
FIG. 2 is a block diagram illustrating a control system of a camera-shake preventing function according to the present invention.

FIG. 2 is a block diagram illustrating a control system of a camera-shake preventing function of the camera-shake preventing device. A release circuit 11, a driver 13, a driver 15 and an interface 16 are respectively connected to the computer-assisted camera body controller 3. The release circuit 11 becomes active on depressing a release button. The driver 13 drives a buzzer 12. The driver 15 drives an indicator 14. The interface 16 is connected to the connector 8. The release circuit 11 acts to open and close a shutter by turning ON a metering/focusing switch in a half-depressed state of the release button and turning ON a release switch in a full-depressed state. Photographing is thus conducted.

A manually operable compensating mode selection switch 21, a camera-shake detecting sensor 4, a driver 22 and an interface 23 are respectively connected to the lens controller 7. The switch 21 selects a camera-shake compensating mode. The sensor 4 outputs an analog signal on detecting a frequency and an amplitude of the camera-shake caused by the hand movement. The driver 22 drives a camera-shake compensating actuator 6. The interface 23 is connected to the connector 8. The lens controller 7 computes a proper camera-shake compensating quantity from the analog signal inputted from the sensor 4 as well as from a focal distance of the lens. The camera-shake compensating actuator 6 is thus driven by the driver 22. The camera-shake compensating mode that is to be selected by the compensating mode selection switch 21 includes a regular compensating mode for regularly compensating the camera-shake in the half-depressed state of the release button. The camera-shake compensating mode further includes a release compensating mode for compensating the camera-shake after fully depressing the release button.

The body controller 3 transmits, to the lens controller 7, signals such as a compensation end signal, a half-depression signal and a full-depression signal of the release button, etc.. The lens controller 7 transmits, to the body controller 3, identifying data of the interchangeable lens 2 equipped with a camera-shake preventing mechanism, focal distance data, an alarm signal, etc..

Figure 3:
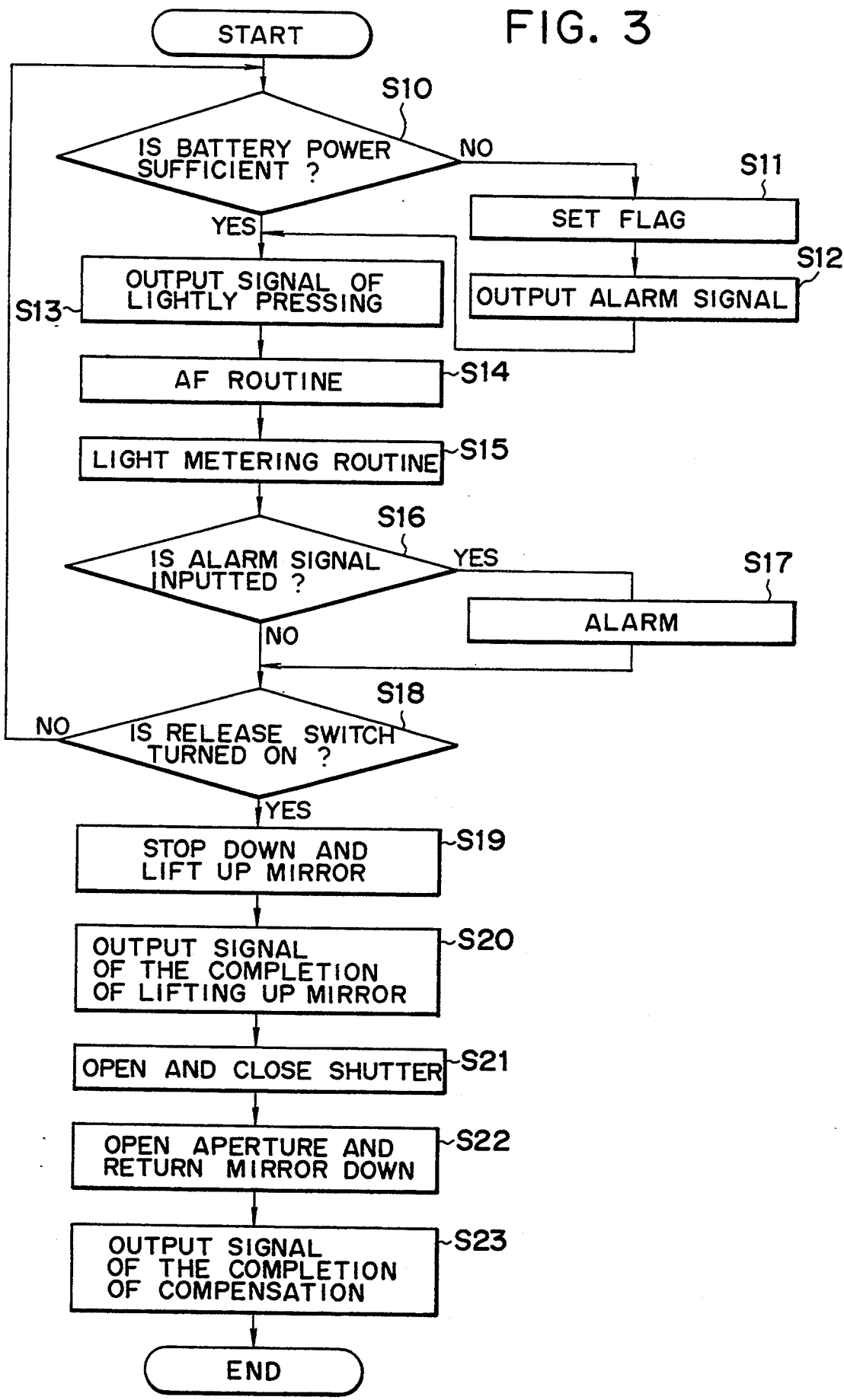
FIG. 3 is a flowchart showing processing procedures of a release action by a camera body controller.

The operation of this embodiment for shake compensation will be explained with reference to a flowchart of FIG. 4. However, the following explanation starts with the processing of the camera body controller 3, referring to a flowchart of FIG. 3.

This processing is started by turning ON the metering/focusing switch with a half-depression of the release button through the release circuit 11. A battery check for checking a consumed state of a battery is at first conducted (step S10). As a result of this checking, if it has proven that the battery is consumed over a predetermined quantity, a battery flag is set (step S11). The alarm signal is then generated (step S12).

Subsequently, the half-depression signal indicating that the release button has been half-depressed is outputted to the lens controller 7 of the interchangeable lens 2 (step S13). An AF (auto-focus) process (step S14) and a metering process (step S15) are then executed. The AF process is defined as a process to automatically adjust a focusing position of the photographing lens by taking in focusing information from an unillustrated focusing unit. The metering process is to determine a shutter speed and a stop value for obtaining a proper exposure during photographing by taking in metering information from an unillustrated metering unit.

The next step is to judge whether an alarm signal is inputted or not (step S16) from the controller 7 of the interchangeable lens. The alarm signal is transmitted to the body controller 3 from the lens controller 7 of the interchangeable lens 2 when the camera-shake quantity exceeds a compensable range. When this alarm signal is inputted, the body controller 3 causes buzzing of the buzzer 12 through the driver 13. Further, a camera-shake alarm is indicated on the indicator 14 through the driver 15 (step S17), thus giving the photographer an alarm indicating that the camera-shake exceeds the compensable range.

Judged subsequently is whether or not the switch is turned ON with a full-depression of the release button (step S18). If not turned ON, the action returns to step S10, wherein the processes described above are repeated. If turned ON, a diaphragm mechanism is stopped down to a preset stop value and, simultaneously, a mirror is lifted up (step S19). Then, the detector (unillustrated) detects a completion of the mirror-up. A mirror-up completion signal is outputted to the lens controller 7 of the interchangeable lens 2 (step S20).

On completing the stop-down and the mirror-up, the shutter is opened. The shutter is closed after providing the film with a proper exposure (step S21). Subsequently, the diaphragm is opened, and the mirror is returned down (step S22). A compensation end signal is outputted to the lens controller 7 (step S23). The processes are thus ended.

The following is an explanation of a camera-shake preventing action by the lens controller 7 with reference to a flowchart of FIG. 4A and 4B.

To begin with, the compensation optical system including a compensation lens 5, etc. is set in the initial position (step S30). Judged then is whether or not the half-depression signal of the release button is inputted from the camera body controller 3 of the camera body 1 (step S31). The half-depression signal of the release button is outputted from the camera body controller 3 by the process in step S13.

Upon inputting the half-depression signal, the camera-shake detecting sensor 4 starts detecting a camera-shake quantity (step S32). Whether or not the camera-shake quantity exceeds the compensable range is judged (step S33). If the quantity exceeds the compensable range, the alarm signal is outputted to the body controller 3 (step S34). The body controller 3 recognizes inputting of this alarm signal in step S16. The alarm is indicated in a step S17.

Judged subsequently is whether the camera-shake compensating mode selected by the compensating mode selection switch 21 is the regular compensating mode or the release compensating mode (step S35). If the regular compensating mode is selected, whether or not the battery flag is set is judged (step S36). The battery flag is set when the battery is consumed over the predetermined quantity in the process of step S11 described above. Whereas if not set, the battery is still sufficient. Hence, the compensation of the camera-shake is started (step S37). If the battery flag is set, or if the selected camera-shake compensating mode is the release compensating mode, the camera-shake is compensated during only releasing. Therefore, the action shifts to the next process without initiating the compensation of the camera-shake.

Next, whether the mirror-up completion signal is inputted or not is judged (step S38). The mirror-up completion signal is outputted from the body controller 3 by the process of the above-mentioned step S20. On inputting the mirror-up completion signal from the body controller 3, the lens controller 7 sets the compensation optical system including the compensation lens 5 in a center position (step S39).

Setting of the compensation optical system in the center position is intended to efficiently employ a camera-shake compensating function. A movable quantity of the compensation optical system for effecting the compensation is limited. The limit value implies an impossibility of further compensation. Incidentally, a compensating direction can be presumed beforehand from a pre-release state. The probability is, however, low. In connection with the center position, even when moved in any direction, it is possible to secure a moving quantity from the center position defined as the optical axis to the limit value. There is no constraint in the compensating direction. A viewfinder image is deflected, if set in the center position at a timing before starting or completing the mirror-up. Besides, the photographed image is deflected after the shutter has been opened. Hence, the best timing is given after the completion of the mirror-up and before the shutter is opened.

The compensation optical system is thus set in the center position. Judged thereafter (step 40) is whether the selected compensating mode is the regular compensating mode (switch 21 set to regular mode and flag not set or the release compensating mode (switch 21 set to release mode or flag set). In the case of the release compensating mode, the compensation of the camera-shake is started (step S41). In the case of the regular compensating mode, the action skips over this process, because the compensation of the camera-shake has already been started in step S37.

Subsequently, whether or not the compensation end signal is inputted is judged (step S42). The compensation end signal is outputted from the body controller 3 by the process in step S23 discussed above. The lens controller 7 finishes compensating the camera-shake upon inputting the compensation end signal (step S43). The compensation optical system including the compensation lens 5, etc. is set in the initial position, thus ending the process (step S44).

As described above, in accordance with this embodiment, when either camera-shake compensating mode is selected, the lens controller 7 starts detecting the camera-shake through the camera-shake detecting sensor 4 on inputting the half-depression signal of the release button. If the camera-shake quantity detected is in excess of the compensable range, the alarm signal is outputted to the body controller 3. The body controller 3 which has inputted the alarm signal makes the buzzer 12 and the indicator 14 active. The body controller 3 gives the photographer an alarm indicating that the camera-shake quantity exceeds the compensable range.

If the regular compensating mode is selected by the compensating mode selecting switch as a camera-shake compensating mode, and the battery is sufficient the lens controller 7 starts driving the camera-shake compensating actuator 6 through the driver 22 in response to the half-depression signal of the release button. If the battery is insufficient the the regular compensating mode is selected, by the selecting switch, or if the release compensating mode is selected by the selecting switch the lens controller 7 starts driving the camera-shake compensating actuator 6 through the driver 22 in response to the full-depression signal of the release button. The camera-shake is thus compensated.

The body controller 3, whichever compensating mode is selected, outputs the compensation end signal to the lens controller 7 when ending the release action. The lens controller 7 which has inputted the compensation end signal finishes compensating the camera-shake.

According to the present invention, the camera-shake compensating mode includes the regular compensating mode for regularly compensating the camera-shake after the release button has been half-depressed. The camera-shake compensating mode further includes the release compensating mode for compensating the camera-shake during only releasing. Hence, if the release button remains half-depressed for a long time, a futile consumption of the battery can be restrained by selecting the release compensating mode. When it is desired to previously confirm an effect of compensating of the camera-shake, the regular compensating mode is selected. The effect of the camera-shake compensation can be thereby confirmed.

Further, according to the present invention, if the battery is consumed over a predetermined quantity, the camera-shake is compensated during only releasing even when the regular compensating mode is selected. It is therefore possible to prevent such a situation that the device does not normally operate during photographing.

Although the illustrative embodiments of the present invention have been described in detail with reference to the accompanying drawings, it is to be understood that the present invention is not limited to those embodiments. Various changes or modifications may be effected therein by one skilled in the art without departing from the scope or the spirit of the invention.

What is claimed is:

1. A camera-shake preventing device comprising:
   camera-shake detecting means for detecting a camera-shake caused by hand movement;
   computing means for computing a proper camera-shake compensation quantity from the camera-shake detected by said camera-shake detecting means;
   a camera-shake compensating lens drivable for compensating the camera-shake;
   lens driving means for driving said camera-shake compensating lens in accordance with the compensation quantity computed by said computing means so as to compensate the camera-shake;
   a manually operable compensating mode selecting switch for selecting between a regular compensating mode and a release compensating mode; and
   control means for starting compensation of the camera-shake through said lens driving means in response to half-depression of a release button when said compensating mode selecting switch selects the regular compensating mode, and starting compensation of the camera-shake through said lens driving means in response to full-depression of said release button when said compensating mode selecting switch selects the release compensating mode.

2. A camera-shake preventing device according to claim 1, further comprising battery power detecting means for detecting a consumed state of a power source battery, and wherein when it is detected that said battery has been consumed beyond a predetermined amount, said control means starts compensation of the camera shake in response to full-depression of said release button regardless of whether said compensating mode selecting switch selects the regular compensating mode.

* * * * *